US011983936B2

(12) United States Patent
Konishi

(10) Patent No.: US 11,983,936 B2
(45) Date of Patent: May 14, 2024

(54) DATA COLLECTION DEVICE, VEHICLE CONTROL DEVICE, DATA COLLECTION SYSTEM, DATA COLLECTION METHOD, AND STORAGE MEDIUM

(71) Applicant: HONDA MOTOR CO., LTD., Tokyo (JP)

(72) Inventor: Yuichi Konishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 17/673,837

(22) Filed: Feb. 17, 2022

(65) Prior Publication Data

US 2022/0309800 A1  Sep. 29, 2022

(30) Foreign Application Priority Data

Mar. 29, 2021 (JP) ................................ 2021-055099

(51) Int. Cl.
*G06V 20/58* (2022.01)
*B60W 40/04* (2006.01)
*G06V 10/774* (2022.01)
*G06V 10/82* (2022.01)

(52) U.S. Cl.
CPC ........... *G06V 20/584* (2022.01); *B60W 40/04* (2013.01); *G06V 10/774* (2022.01); *G06V 10/82* (2022.01); *B60W 2420/403* (2013.01); *B60W 2520/14* (2013.01); *B60W 2556/10* (2020.02)

(58) Field of Classification Search
None
See application file for complete search history.

(56) References Cited

U.S. PATENT DOCUMENTS

2018/0293894 A1* 10/2018 Zhang .................... G08G 1/167
2020/0272838 A1*  8/2020 Vladimerou .......... G06F 18/214

FOREIGN PATENT DOCUMENTS

JP         2020-087037         6/2020

* cited by examiner

*Primary Examiner* — Eileen M Adams
(74) *Attorney, Agent, or Firm* — Amin, Turocy & Watson, LLP

(57) ABSTRACT

A data collection device of an embodiment includes a processor. The processor is configured to execute a program to acquire an image obtained by capturing surroundings of a first vehicle, determine whether the first vehicle has performed a lane change during a determination period based on information indicating a traveling history of the first vehicle, and collect the image included in the determination period as training data for a determination model that determines whether there is an obstacle in a road in a case where it is determined that the first vehicle has not performed a lane change.

14 Claims, 10 Drawing Sheets

DATA COLLECTION DEVICE, VEHICLE CONTROL DEVICE, DATA COLLECTION SYSTEM, DATA COLLECTION METHOD, AND STORAGE MEDIUM

CROSS-REFERENCE TO RELATED APPLICATION

Priority is claimed on Japanese Patent Application No. 2021-055099, file Mar. 29, 2021, the content of which is incorporated herein by reference.

BACKGROUND OF THE INVENTION

Field of the Invention

The present invention relates to a data collection device, a vehicle control device, a data collection system, a data collection method, and a storage medium.

Description of Related Art

In the related art, a technique of determining the presence or absence of an obstacle in a road on the basis of an image of the road captured by an in-vehicle camera has been known (see, for example, Japanese Unexamined Patent Application, First Publication No. 2020-87037).

SUMMARY OF THE INVENTION

In the related art, it is necessary to prepare a large number of pieces of training data for generating a determination model that determines the presence or absence of an obstacle. For example, it has been necessary to manually select and label images that do not contain obstacles from a huge number of road images, and it has taken time and effort to prepare such training data. In addition, in a case where a learning process is performed using an image containing an obstacle, the frequency of appearance of the obstacle is low, and thus it is not easy to prepare a large number of pieces of training data.

The present invention was contrived in view of such circumstances, and one object thereof is to provide a data collection device, a vehicle control device, a data collection system, a data collection method, and a storage medium which make it possible to easily collect training data for a determination model that determines whether there is an obstacle in a road.

The following configurations are adopted in a data collection device, a vehicle control device, a data collection system, a data collection method, and a storage medium according to this invention.

(1) According to an aspect of this invention, there is provided a data collection device including a processor, wherein the processor is configured to execute a program to acquire an image obtained by capturing surroundings of a first vehicle, determine whether the first vehicle has performed a lane change during a determination period based on information indicating a traveling history of the first vehicle, and collect the image included in the determination period as training data for a determination model that determines whether there is an obstacle in a road in a case where it is determined that the first vehicle has not performed a lane change.

(2) In the data collection device according to the aspect of the above (1), the processor determines whether the first vehicle has performed a lane change based on information on operation of a direction indicator of the first vehicle.

(3) In the data collection device according to the aspect of the above (1) or (2), the processor determines whether a second vehicle traveling in a lane different from a traveling lane of the first vehicle has performed a lane change during the determination period, and collects the image included in the determination period as the training data in a case where it is determined that the second vehicle has not performed a lane change.

(4) In the data collection device according to the aspect of the above (3), the processor determines whether the second vehicle has performed a lane change based on information on operation of a direction indicator of the second vehicle which is recognized from the acquired image.

(5) In the data collection device according to any aspect of the above (1) to (4), the processor further calculates the determination period based on information on odometry of the first vehicle and imaging conditions of a camera mounted on the first vehicle.

(6) In the data collection device according to any aspect of the above (1) to (5), the processor further learns the collected training data and generates the determination model.

(7) In the data collection device according to any aspect of the above (1) to (5), the processor further transmits the collected training data to an external learning device and receives the determination model generated by the learning device learning the training data from the learning device.

(8) According to another aspect of this invention, there is provided a vehicle control device including: the data collection device according to the aspect of the above (6) or (7); and a second determiner configured to determine whether a traveling lane of the first vehicle is travelable using the determination model.

(9) According to another aspect of this invention, there is provided a data collection system including: the data collection device according to any aspect of the above (1) to (6); and a camera mountable on the first vehicle.

(10) According to another aspect of this invention, there is provided a data collection system including: the data collection device according to the aspect of the above (7); a camera mountable on the first vehicle; and the learning device.

(11) According to another aspect of this invention, there is provided a data collection method including causing a computer to: acquire an image obtained by capturing surroundings of a first vehicle; determine whether the first vehicle has performed a lane change during a determination period based on information indicating a traveling history of the first vehicle; and collect the image included in the determination period as training data for a determination model that determines whether there is an obstacle in a road in a case where it is determined that the first vehicle has not performed a lane change.

(12) According to another aspect of this invention, there is provided a computer readable non-transitory storage medium having a program stored therein, the program causing a computer to: acquire an image obtained by capturing surroundings of a first vehicle; determine whether the first vehicle has performed a lane change during a determination period based on information indicating a traveling history of the first vehicle; and collect the image included in the determination period as training data for a determination model that determines whether there is an obstacle in a road in a case where it is determined that the first vehicle has not performed a lane change.

According to the aspects of the above (1) to (12), it is possible to easily collect training data for determining an obstacle in a road.

According to the aspect of the above (5), it is possible to further improve the accuracy of training data.

According to the aspects of the above (6) to (8), it is possible to generate a determination model for determining whether there is an obstacle in a road, and to realize a high-accuracy determination of whether traveling on the road is possible using this determination model.

DETAILED DESCRIPTION OF THE INVENTION

Hereinafter, embodiments of a data collection device, a vehicle control device, a data collection system, a data collection method, and a storage medium of the present invention will be described with reference to the accompanying drawings.

FIRST EMBODIMENT

[Overall Configuration]

Figure 1:
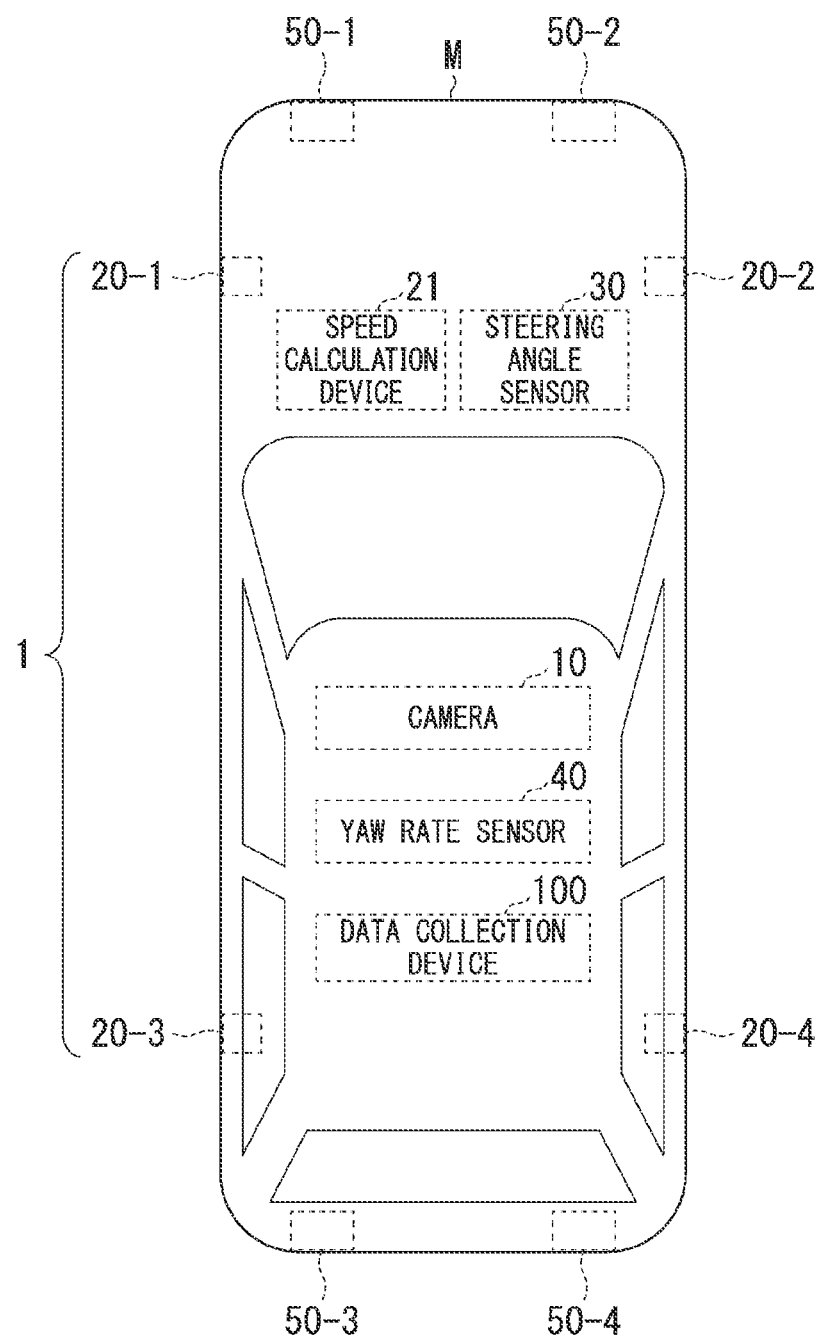
FIG. 1 is a diagram showing an example of a configuration of a data collection system 1 according to a first embodiment.

FIG. 1 is a diagram showing an example of a configuration of a data collection system 1 according to a first embodiment. The data collection system is mounted in a host vehicle M. The data collection system 1 includes, for example, a camera 10, wheel speed sensors 20-1 to 20-4, a speed calculation device 21, a steering angle sensor 30, and a yaw rate sensor 40 which are examples of devices for acquiring odometry information, blinkers (direction indicators) 50-1 to 50-4, and a data collection device 100. The host vehicle M may be a vehicle having an automated driving function or may be a vehicle traveling by manual driving. In addition, its drive mechanism is not particularly limited, and various vehicles such as an engine vehicle, a hybrid vehicle, an electric automobile, and a fuel cell vehicle can be used as the host vehicle M. Hereinafter, in a case where the wheel speed sensors need not be distinguished from each other, they are simply described as the wheel speed sensor 20. Hereinafter, in a case where the blinkers need not be distinguished from each other, they are simply described as the blinker 50. The host vehicle M is an example of a "first vehicle."

The camera 10 is a digital camera using a solid-state imaging element such as, for example, a charge coupled device (CCD) or a complementary metal oxide semiconductor (CMOS). The camera 10 is installed at any points on the host vehicle M. In a case where a forward image is captured, the camera 10 is installed on the upper portion of the front windshield, the rear surface of the rear-view mirror, or the like. In a case where a backward image is captured, the camera 10 is installed on the upper portion of the rear windshield, the back door, or the like. In a case where a sideward image is captured, the camera 10 is installed on the side mirror or the like. The camera 10, for example, repeatedly captures an image of the surroundings of the host vehicle M periodically and acquires surrounding images. Hereinafter, a case where a forward image of the host vehicle M is captured by the camera 10 will be described as an example.

The term "odometry information" refers to the result of estimating the position and posture of a moving object on the basis of the output value of a device (for example, a sensor) installed on the moving object in order to measure the behavior of the moving object. In the case of a vehicle, the wheel speed sensor 20 that measures the speed of the wheel, the speed calculation device 21 that calculates the speed of the vehicle on the basis of the output of the wheel speed sensor 20, the steering angle sensor 30 that detects the operation angle of a steering wheel (or the angle of a steering mechanism), some or all of the yaw rate sensors 40 that detect a rotational speed around the vertical axis generated in the vehicle, other sensors similar thereto, or the like corresponds to the above "sensor." As a sensor for acquiring a speed, a sensor that detects the rotation angle of a transmission or a motor for traveling may be used.

The wheel speed sensor 20 is installed on each wheel of the host vehicle M. The wheel speed sensor 20 outputs a pulse signal each time the wheel rotates by a predetermined angle. The speed calculation device 21 calculates the speed of each wheel by counting the pulse signal which is input from each wheel speed sensor 20. In addition, the speed calculation device 21 calculates the speed of the host vehicle M by averaging, for example, the speeds of the driven wheels among the speeds of the wheels.

The data collection device 100 collects training data used for generating a determination model on the basis of a surrounding image of the host vehicle M (for example, an image in front of the host vehicle) captured by the camera 10. The determination model determines the presence or absence of obstacles on the road. Alternatively, the determination model determines the presence or absence of obstacles on the road and determines whether traveling on the road is possible. The obstacle is any object or an event that hinders the traveling of a vehicle. Examples of the obstacles include any fallen objects, damaged locations of the road, vehicles stopped due to an accident or the like, persons, animals, temporarily installed signs indicating inability to travel, road construction, and the like.

Figure 2:
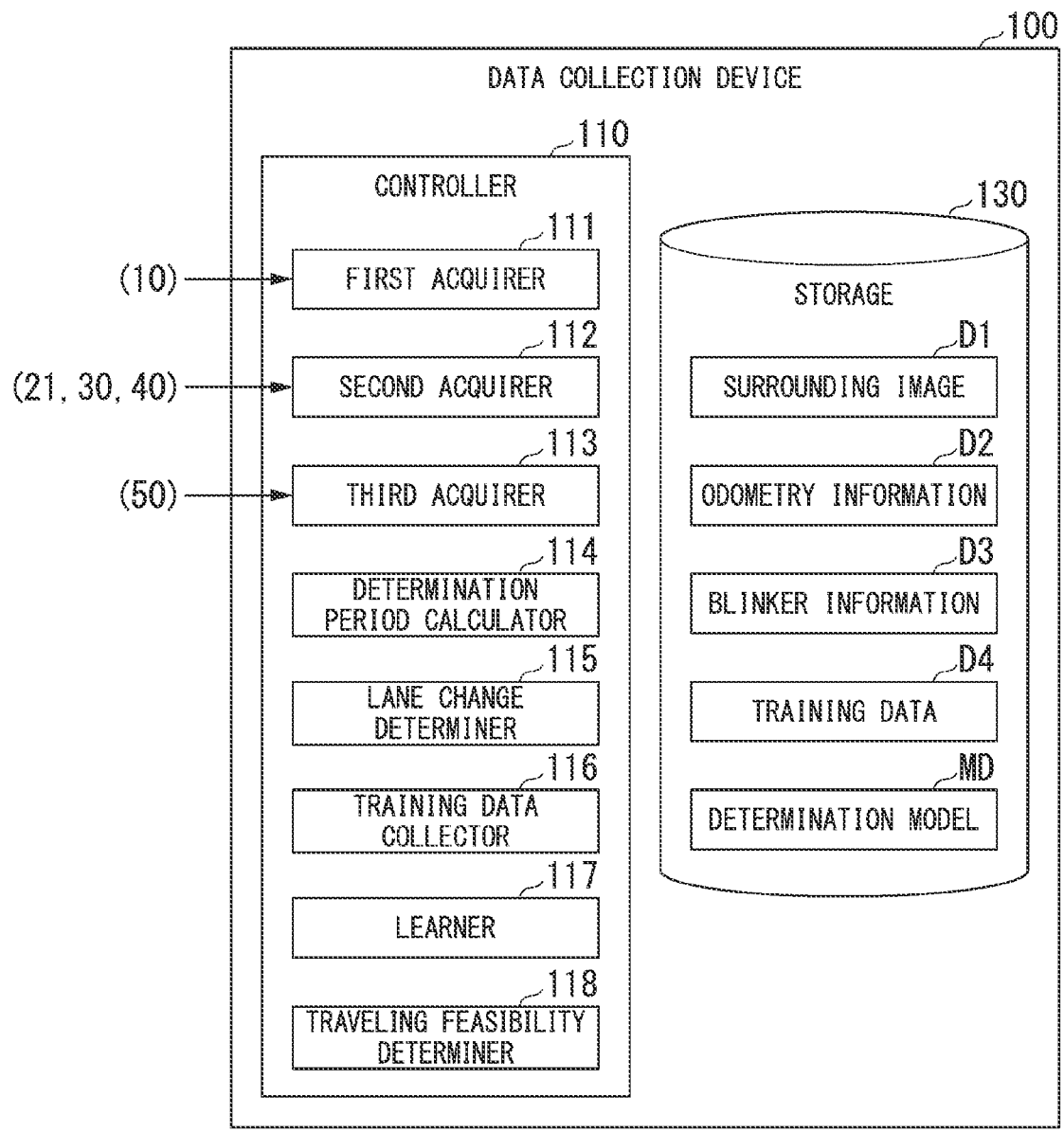
FIG. 2 is a diagram showing an example of a configuration of a data collection device 100 according to the first embodiment.

FIG. 2 is a diagram showing an example of a configuration of the data collection device 100 according to the first embodiment. The data collection device 100 includes, for example, a controller 110 and a storage 130. The controller 110 includes, for example, a first acquirer 111, a second acquirer 112, a third acquirer 113, a determination period calculator 114, a lane change determiner 115, a training data collector 116, a learner 117, and a traveling feasibility determiner 118. The first acquirer 111 is an example of an "acquirer." The determination period calculator 114 is an example of a "calculator." The lane change determiner 115 is an example of a "first determiner." The training data collector 116 is an example of a "collector." The learner 117 is an example of a "learner." The traveling feasibility determiner 118 is an example of a "second determiner." The data collection device 100 including the traveling feasibility determiner 118 is an example of a "vehicle control device."

The components of the controller 110 are realized by a hardware processor (computer) such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as a hard disk drive (HDD) or a flash memory (a storage device including a non-transitory storage medium) in advance, may be stored in a detachable storage medium such as a DVD or a CD-ROM (non-transitory storage medium), or may be installed by the storage medium being installed in a drive device.

The first acquirer 111 acquires a surrounding image D1 obtained by capturing an image of the surroundings of the host vehicle M from the camera 10, and stores the acquired surrounding image in the storage 130.

The second acquirer 112 acquires the output values of the speed calculation device 21, the steering angle sensor 30, and the yaw rate sensor 40, synthesizes these output values to generate odometry information D2 of the host vehicle M, and stores the generated odometry information in the storage 130. The odometry information D2 may be information represented by a movement amount of 6 degrees of freedom, or may be a movement amount of 3 degrees of freedom practically including a translational movement amount related to each of XY axes and a rotational movement amount about a Z axis. Various schemes are known as calculation schemes for generating the odometry information D2, and as an example, a calculation scheme referred to as a unicycle model may be adopted. In this calculation scheme, for example, the output value of the speed calculation device 21 and the output value of the steering angle sensor 30 are used as input values. The odometry information which is an output indicates, for example, the position in an X direction, the position in a Y direction, and the orientation of the host vehicle M at a certain time.

The third acquirer 113 acquires information relating to lighting and blinking of the blinker 50 from the blinker 50 and stores the acquired information as blinker information D3 in the storage 130. Alternatively, the third acquirer 113 may acquire the blinker information D3 from a blinker switch (blinker lever) (not shown) that accepts an instruction for lighting and blinking of the blinker 50 which is performed by an occupant of the host vehicle M. Alternatively, in a case where the host vehicle M is traveling on the basis of automated driving control, the third acquirer 113 may acquire the blinker information D3 from an automated driving control device (not shown) that controls lighting and blinking of the blinker 50.

The determination period calculator 114 calculates a determination period for determining whether there is a lane change. The determination period calculator 114 calculates the determination period on the basis of, for example, the imaging conditions of the camera 10 such as the resolution or the field of view (FOV) and the odometry information D2 (cumulative distance of odometry). For example, as the resolution becomes higher, the determination period calculator 114 sets the cumulative distance of odometry to be longer. For example, as the angle of the FOV becomes narrower (as the angle becomes smaller), the determination period calculator 114 sets the cumulative distance of odometry to be longer. The determination period calculator 114 calculates the determination period from the set cumulative distance of odometry and the speed of the host vehicle M.

That is, the determination period calculator 114 calculates the determination period on the basis of the odometry information of the host vehicle M (first vehicle) and the imaging conditions of the camera 10 mounted on the host vehicle M (first vehicle). The details of processing of the determination period calculator 114 will be described later.

The lane change determiner 115 determines whether the host vehicle M has performed a lane change on the basis of information indicating traveling history of the host vehicle M in the determination period calculated by the determination period calculator 114. Alternatively, the lane change determiner 115 determines whether the host vehicle M and another vehicle have performed a lane change in the determination period. The other vehicle is a vehicle traveling in another lane in the same direction as the host vehicle M. The other vehicle is an example of a "second vehicle."

For the host vehicle M, the lane change determiner 115 determines, for example, whether the host vehicle M has performed a lane change on the basis of the blinker information D3 which is acquired from the blinker 50. In addition, the lane change determiner 115 may determine whether the host vehicle M has performed a lane change on the basis of the surrounding image D1 which is acquired from the camera 10. Alternatively, the lane change determiner 115 may determine whether the host vehicle M has performed a lane change on the basis of both the blinker information D3 and the surrounding image D1. For example, the lane change determiner 115 may determine that the host vehicle M has performed a lane change in a case where at least one of the determination result based on the blinker information D3 and the determination result based on the surrounding image D1 indicates that a lane change has been performed.

For the other vehicle, the lane change determiner 115 determines, for example, whether the other vehicle has performed a lane change on the basis of information relating to lighting and blinking of the blinker of the other vehicle included in the surrounding image D1. Meanwhile, the lane change determiner 115 may determine whether the host vehicle M or the other vehicle has stopped.

That is, the lane change determiner 115 determines whether the host vehicle M (first vehicle) has performed a lane change during the determination period on the basis of the information indicating the traveling history of the host vehicle M (first vehicle). The lane change determiner 115 determines whether the host vehicle M (first vehicle) has performed a lane change on the basis of information on the operation of the direction indicator of the host vehicle M (first vehicle). In addition, the lane change determiner 115 determines whether another vehicle (second vehicle) traveling in a lane different from the traveling lane of the host vehicle M (first vehicle) has performed a lane change during the determination period. The lane change determiner 115 determines whether the other vehicle (second vehicle) has performed a lane change on the basis of information on the operation of the direction indicator of the other vehicle (second vehicle) which is recognized from the surrounding image D1.

Since there is a low possibility of the surrounding image in the determination period including an obstacle in a case where it is determined by the lane change determiner 115 that the host vehicle M has not performed a lane change, the training data collector 116 adopts the surrounding image as training data, collects it as training data D4, and stores it in the storage 130. On the other hand, since there is a high possibility of the surrounding image in the determination period including an obstacle in a case where it is determined by the lane change determiner 115 that the host vehicle M has performed a lane change, the training data collector 116 does not adopt the surrounding image as training data.

In addition, since there is a low possibility of the surrounding image in the determination period including an obstacle in a case where it is determined by the lane change determiner 115 that the other vehicle has not performed a lane change, the training data collector 116 adopts the surrounding image as training data, collects it as the training data D4, and stores it in the storage 130. On the other hand, since there is a high possibility of the surrounding image in the determination period including an obstacle in a case where it is determined by the lane change determiner 115 that the other vehicle has performed a lane change, the training data collector 116 does not adopt the surrounding image as training data.

Alternatively, since there is a low possibility of the surrounding image in the determination period including an obstacle in a case where it is determined by the lane change determiner 115 that both the host vehicle M and the other vehicle have not performed a lane change, the training data collector 116 adopts the surrounding image as training data, collects it as the training data D4, and stores it in the storage 130. On the other hand, since there is a high possibility of the surrounding image in the determination period including an obstacle in a case where it is determined by the lane change determiner 115 that at least one of the host vehicle M and the other vehicle has performed a lane change, the training data collector 116 may not adopt the surrounding image as training data.

That is, in a case where it is determined by the lane change determiner 115 that the host vehicle M (first vehicle) has not performed a lane change, the training data collector 116 collects surrounding images included in the determination period as training data for a determination model that determines whether there is an obstacle on the road. In addition, in a case where it is determined by the lane change determiner 115 that the other vehicle (second vehicle) has not performed a lane change, the training data collector 116 collects the surrounding images included in the determination period as training data.

The learner 117 generates a determination model MD by learning the training data D4 collected by the training data collector 116 using a machine learning scheme such as deep learning. The learner 117 stores the generated determination model MD in the storage 130. The determination model MD is a model for determining the presence or absence of an obstacle on the road. For example, when a certain surrounding image is input, the determination model MD outputs information indicating the presence or absence of an obstacle on the road included in this surrounding image. As the determination model MD, for example, a convolutional neural network (CNN) can be used.

That is, the learner 117 learns the training data collected by the training data collector 116 and generates the determination model MD.

The traveling feasibility determiner 118 determines whether traveling on the road on which the host vehicle M is traveling is possible on the basis of the surrounding image captured by the camera 10 during traveling and the determination model MD. In a case where the output when the surrounding image is input to the determination model MD indicates that there is no obstacle, the traveling feasibility determiner 118 determines that traveling on the road is possible. On the other hand, in a case where the output when the surrounding image is input to the determination model MD indicates that there is an obstacle, the traveling feasibility determiner 118 determines that traveling on the road is not possible. For example, in a case where the host vehicle M is traveling by automated driving control, the automated driving control device can set the traveling lane or trajectory of the host vehicle M in consideration of the determination result of the traveling feasibility determiner 118.

That is, the traveling feasibility determiner 118 determines whether the host vehicle M (first vehicle) can travel in the traveling lane using the determination model MD.

The storage 130 stores, for example, the surrounding image D1, the odometry information D2, the blinker information D3, the training data D4, the determination model MD, and the like. The storage 130 is a storage device such as an HDD, a random access memory (RAM), or a flash memory.

Figure 3:
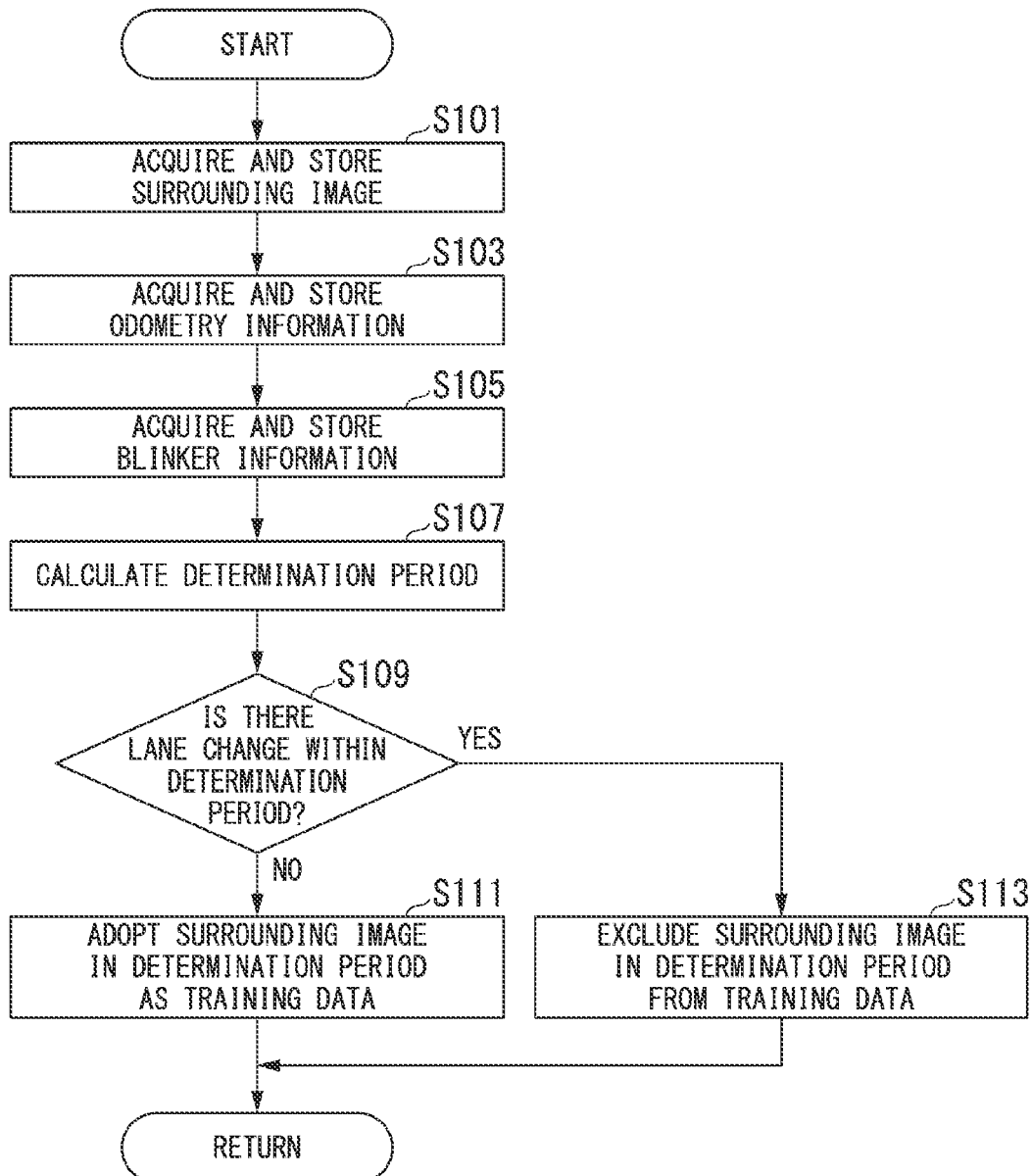
FIG. 3 is a flowchart showing an example of a data collection process which is performed by the data collection device 100 according to the first embodiment.

Hereinafter, a data collection process will be described with reference to a flowchart. FIG. 3 is a flowchart showing an example of a data collection process which is performed by the data collection device 100 according to the first embodiment. The processing of the flowchart shown in FIG. 3 is repeatedly executed while the host vehicle M is traveling on a road which is a target for data collection. Meanwhile, the order of the processing steps of the flowchart to be described below may be changed, or a plurality of processing steps may be executed in parallel.

First, the first acquirer 111 acquires the surrounding image D1 captured by the camera 10 and stores the acquired surrounding image in the storage 130 (step S101). The second acquirer 112 acquires the output values of the speed calculation device 21, the steering angle sensor 30, and the yaw rate sensor 40, synthesizes the acquired output values to generate the odometry information D2 of the host vehicle M, and stores the generated odometry information in the storage 130 (step S103). In addition, the third acquirer 113 acquires the blinker information D3 of the blinker 50 from the blinker 50 and stores the acquired blinker information in the storage 130 (step S105). While the host vehicle M is traveling on the road which is a target for data collection, the processes of steps S101, S103, and S105 described above are continuously executed in parallel.

Figure 4A:
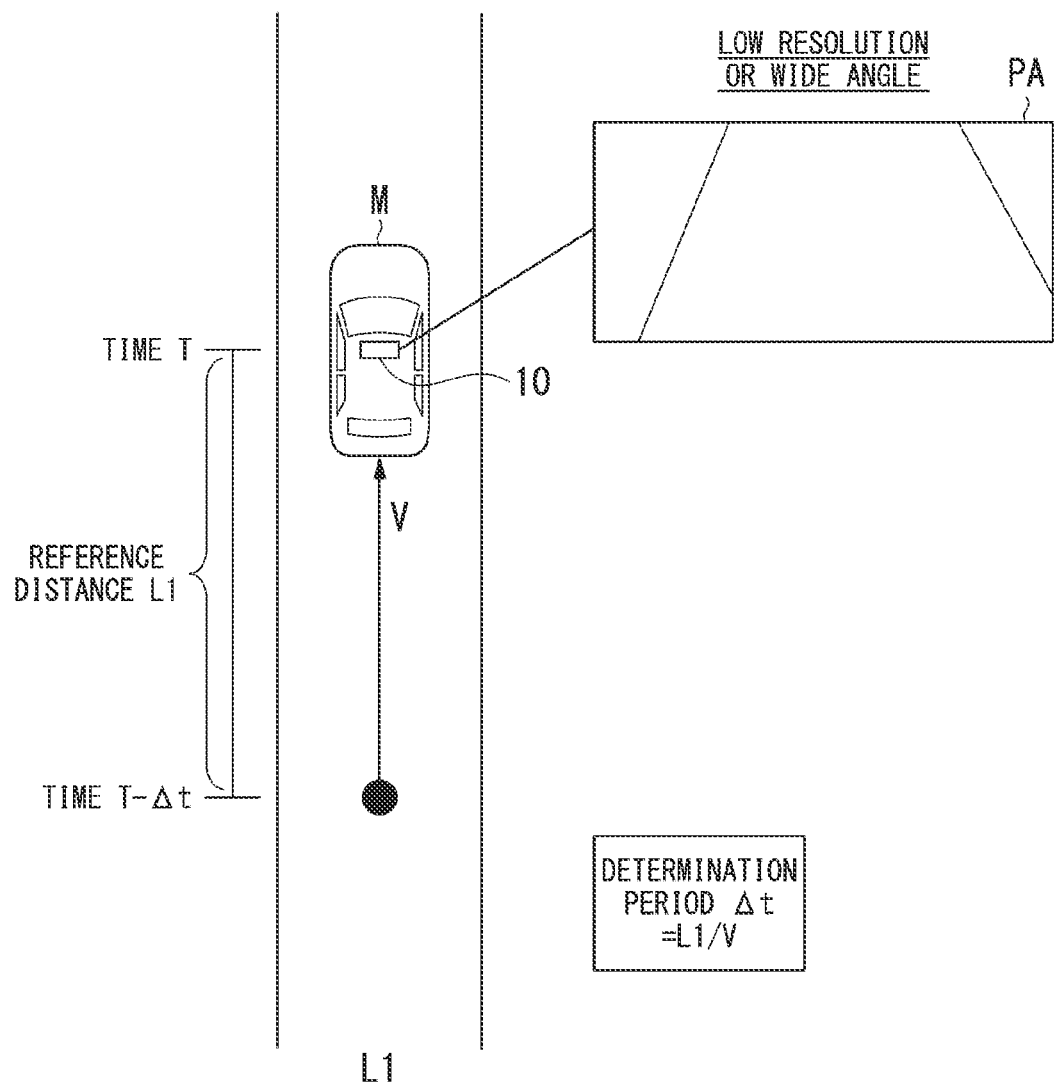
FIG. 4A is a diagram showing an example of a process of calculating a determination period which is performed by a determination period calculator 114 according to the first embodiment.
Figure 4B:
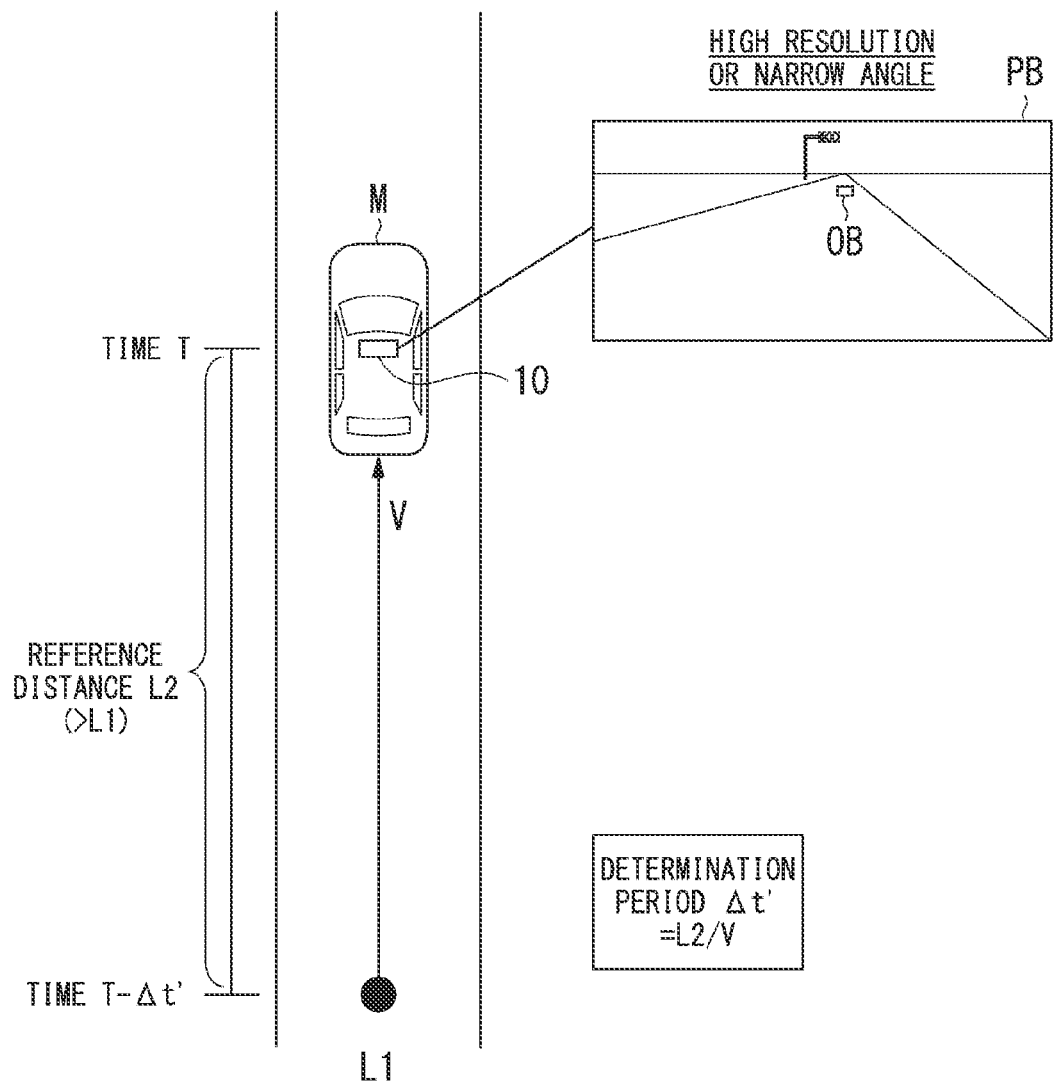
FIG. 4B is a diagram showing an example of a process of calculating a determination period which is performed by the determination period calculator 114 according to the first embodiment.

Next, the determination period calculator 114 calculates a determination period for determining whether there is a lane change (step S107). The determination period calculator 114 calculates the determination period on the basis of the imaging conditions of the camera 10 and the odometry information D2. FIGS. 4A and 4B are diagrams showing an example of a process of calculating a determination period which is performed by the determination period calculator 114 according to the first embodiment. FIG. 4A shows an example in which the host vehicle M captures a surrounding image in a low resolution or an FOV (wide angle) imaging mode using the camera 10 while traveling in a lane L1 at a speed V. On the other hand, FIG. 4B shows an example in which the host vehicle M captures a surrounding image in a high resolution or an FOV (narrow angle) imaging mode using the camera 10 while traveling in the lane L1 at the speed V.

As shown in FIG. 4A, in a case where the camera 10 performs imaging in a low resolution or an FOV (wide angle) imaging mode, a range relatively close to the host vehicle M is mainly an imaging target, and a range distant from the host vehicle M is not an imaging target. Therefore, a range close to the host vehicle M is reflected in a surrounding image PA captured by the camera 10, and thus in a case where the image is not included in a distant imaging target or even in a case where the image is included in the imaging target, the image is unclear and its detailed content cannot be ascertained. As a result, there is a low possibility of a distant obstacle being reflected in the surrounding image captured in such imaging conditions. In this case, the cumulative distance of odometry (reference distance L1) is set to be relatively short. The determination period calculator 114 calculates a determination period Δt by, for example, dividing the reference distance L1 set in advance in accordance with such imaging conditions by the current speed V calculated from the odometry information D2.

On the other hand, as shown in FIG. 4B, in a case where the camera 10 performs imaging in a high resolution or an FOV (narrow angle) imaging mode, the range distant from the host vehicle M is also included in the imaging target in addition to the range relatively close to the host vehicle M. Therefore, a range distant from the host vehicle M is also reflected in a surrounding image PB captured by the camera 10. As a result, there is a high possibility of a distant obstacle being reflected in the surrounding image PB captured in such imaging conditions. In this case, the cumulative distance of odometry (reference distance L2) is set to be relatively longer than the reference distance L1. The determination period calculator 114 calculates a determination period Δt' by, for example, dividing the reference distance L2 set in advance in accordance with such imaging conditions by the current speed V calculated from the odometry information D2.

Next, the lane change determiner 115 determines whether the host vehicle M and/or the other vehicle has performed a lane change in the determination period calculated by the determination period calculator 114 (step S109). In a case where it is determined by the lane change determiner 115 that the host vehicle M has not performed a lane change in the determination period, the training data collector 116 adopts the surrounding image in the determination period as training data and stores the adopted surrounding image as the training data D4 in the storage 130 (step S111). On the other hand, since there is a high possibility of the surrounding image in the determination period including an obstacle in a case where it is determined by the lane change determiner 115 that the host vehicle M has performed a lane change in the determination period, the training data collector 116 excludes the surrounding image without adopting the surrounding image as training data (step S113).

Alternatively, in a case where it is determined by the lane change determiner 115 that both the host vehicle M and the other vehicle have not performed a lane change in the determination period, the training data collector 116 adopts the surrounding image in the determination period as training data and stores the adopted surrounding image as the training data D4 in the storage 130 (step S111). On the other hand, since there is a high possibility of the surrounding image in the determination period including an obstacle in a case where it is determined by the lane change determiner 115 that at least one of the host vehicle M and the other vehicle has performed a lane change in the determination period, the training data collector 116 excludes the surrounding image without adopting the surrounding image as training data (step S113).

Figure 5A:
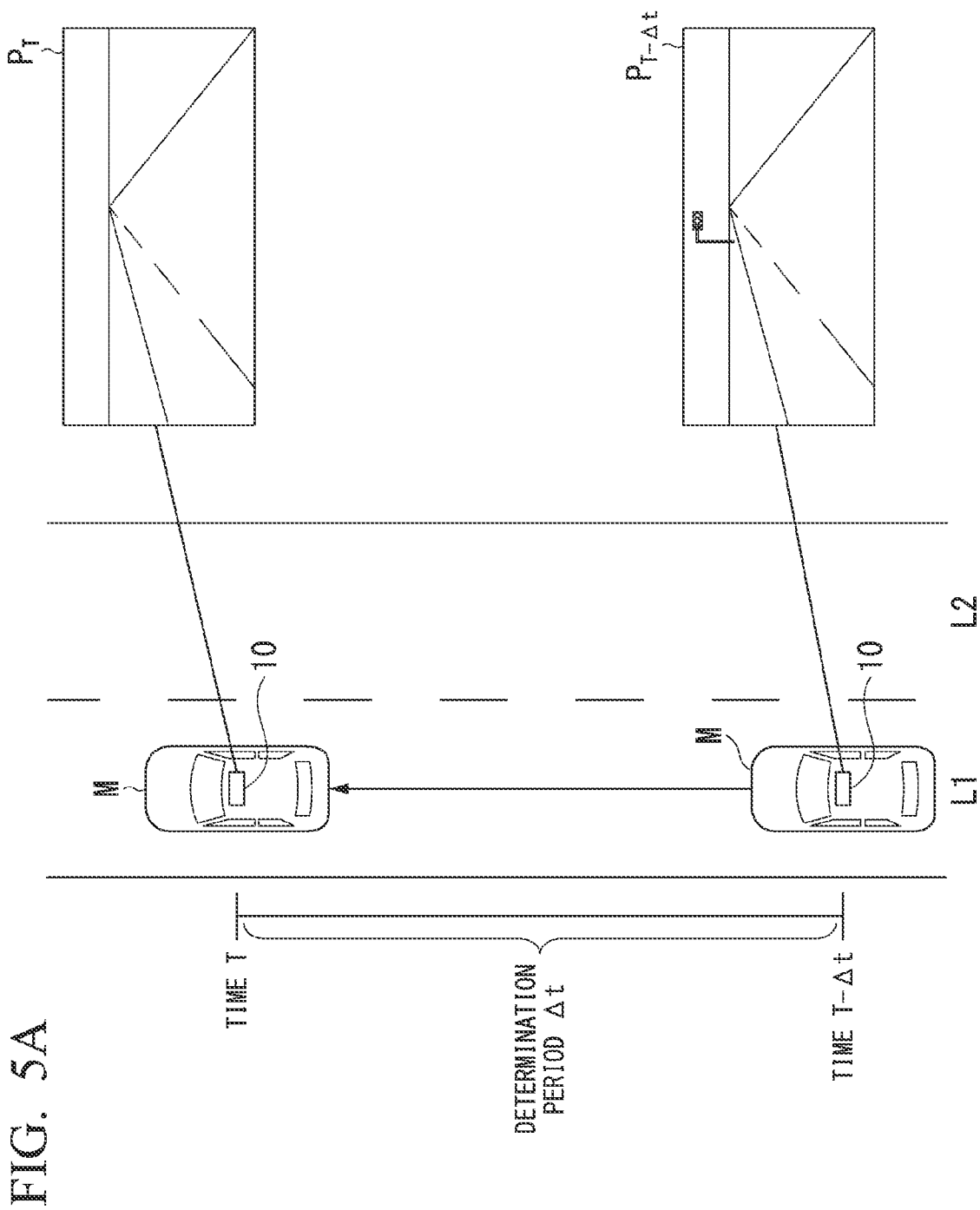
FIG. 5A is a diagram showing an example of a process of determining a lane change of a host vehicle M which is performed by a lane change determiner 115 according to the first embodiment.
Figure 5B:
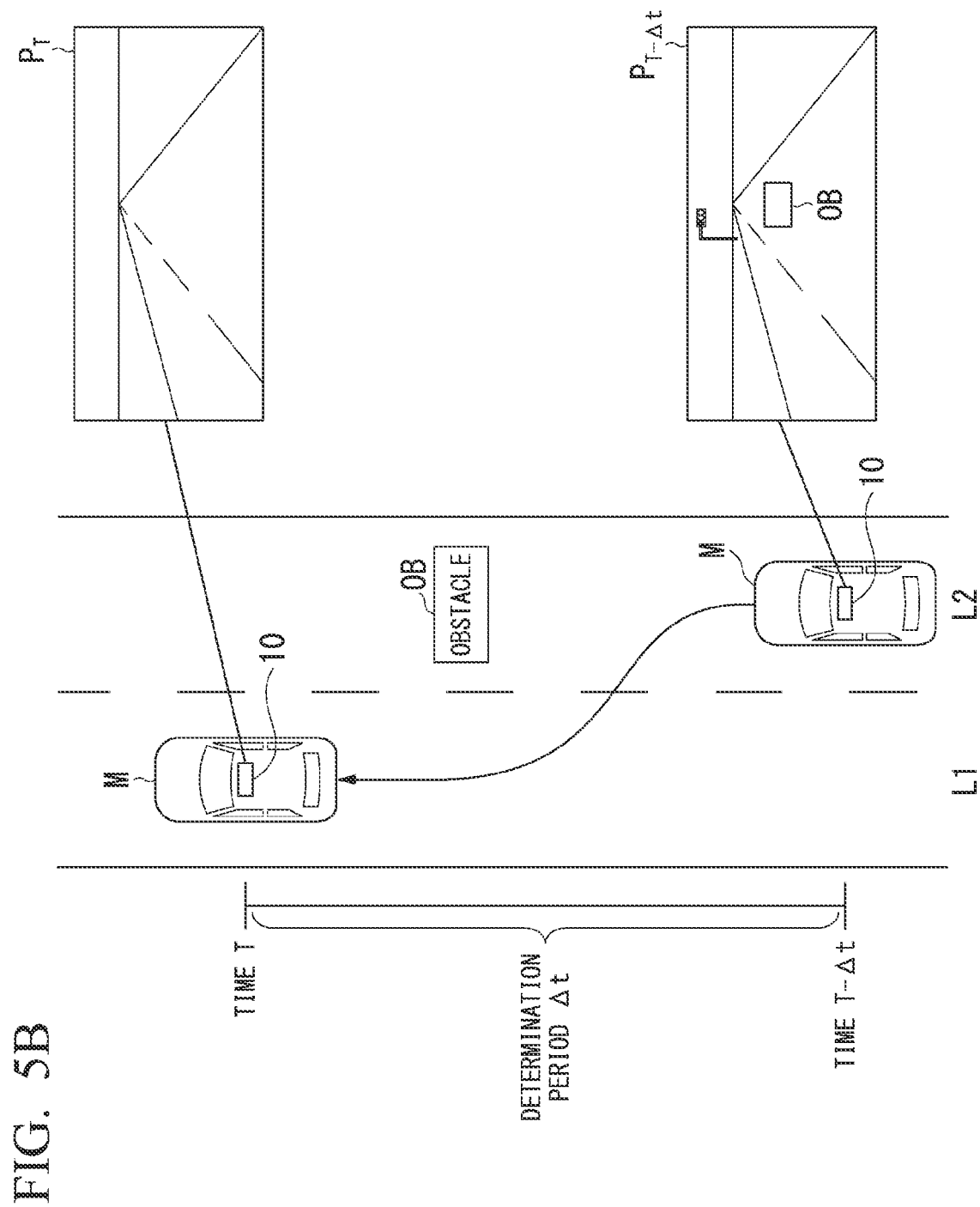
FIG. 5B is a diagram showing an example of a process of determining a lane change of the host vehicle M which is performed by the lane change determiner 115 according to the first embodiment.

FIGS. 5A and 5B are diagrams showing an example of a process of determining a lane change of the host vehicle M which is performed by the lane change determiner 115 according to the first embodiment. The lane change determiner 115 refers to the past blinker information D3 stored in the storage 130 for the determination period Δt (period from a time T−Δt to a time T) calculated by the determination period calculator 114 at a certain time T during traveling, and determines whether there is a lane change of the host vehicle M. In the example shown in FIG. 5A, the host vehicle M is traveling straight ahead in the lane L1 in the determination period Δt and has not performed a lane change. In this case, the training data collector 116 adopts the surrounding image captured during the determination period Δt as training data and stores the adopted surrounding image as the training data D4 in the storage 130.

On the other hand, as in example shown in FIG. 5B, the host vehicle M performs a lane change from a lane L2 to the lane L1 in order to avoid an obstacle OB located on the lane L2 in the determination period Δt. In this case, the training data collector 116 excludes surrounding images captured during the determination period Δt (for example, a group of images such as a surrounding image $P_{T-\Delta t}$ including the obstacle OB captured at the time T−Δt) without adopting the surrounding images as training data.

Figure 6:
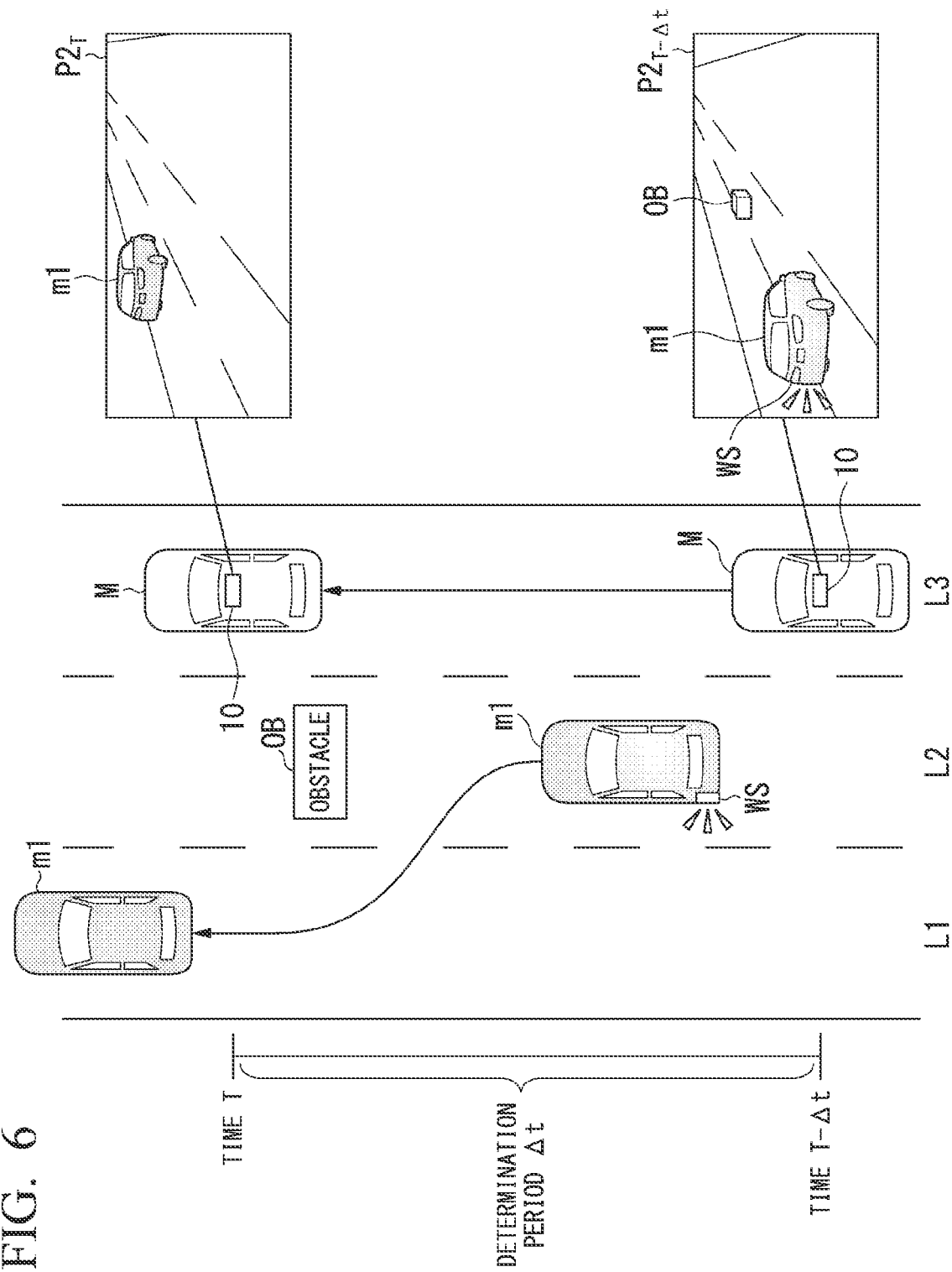
FIG. 6 is a diagram showing an example of a process of determining a lane change of another vehicle m1 which is performed by the lane change determiner 115 according to the first embodiment.

FIG. 6 is a diagram showing an example of a process of determining a lane change of another vehicle m1 which is performed by the lane change determiner 115 according to the first embodiment. FIG. 6 shows an example in which the host vehicle M is traveling straight ahead in a lane L3, and the other vehicle m1 performs a lane change from the lane L2 to the lane L1 in order to avoid the obstacle OB located on the lane L2. The lane change determiner 115 determines whether there is a lane change of the other vehicle m1 on the basis of the past surrounding image D1 stored in the storage 130 for the determination period Δt calculated by the determination period calculator 114 at a certain time T during traveling. For example, the lane change determiner 115 analyzes the surrounding image D1 and extracts information relating to lighting and blinking of a blinker WS of the other vehicle m1 reflected in the surrounding image D1. In a case where the extracted information relating to lighting and blinking of the blinker WS does not indicate that the other vehicle m1 has performed a lane change, the lane change determiner 115 determines that the other vehicle m1 has not performed a lane change. In this case, the training data collector 116 adopts the surrounding image captured during determination period Δt as training data and stores the adopted surrounding image as the training data D4 in the storage 130. On the other hand, in a case where the extracted information relating to lighting and blinking of the blinker WS indicates that the other vehicle m1 has performed a lane change, the lane change determiner 115 determines that the other vehicle m1 has performed a lane change. In this case, the training data collector 116 excludes surrounding images captured during the determination period Δt (for example, a group of images such as the surrounding image $P_{T-\Delta t}$ including the obstacle OB captured at the time T−Δt) without adopting the surrounding images as training data. This concludes the processing of the present flowchart.

According to the data collection system 1 and the data collection device 100 of the first embodiment described above, it is possible to easily collect training data for a determination model that determines whether there is an obstacle in a road. In addition, the training data collected as described above includes images including objects that do not interfere with traveling (objects that do not cause a lane change) such as corrugated cardboard or manholes. Therefore, it is possible to further improve the accuracy of determination of the determination model by using the training data collected in this way. In addition, it is possible to further improve the accuracy of the training data by calculating the determination period on the basis of the imaging conditions of the camera 10 and the odometry information. In addition, it is possible to generate a determination model for determining whether there is an obstacle in a road using the training data collected as described above, and to realize a high-accuracy determination of whether traveling on the road is possible using this determination model.

SECOND EMBODIMENT

Figure 7:
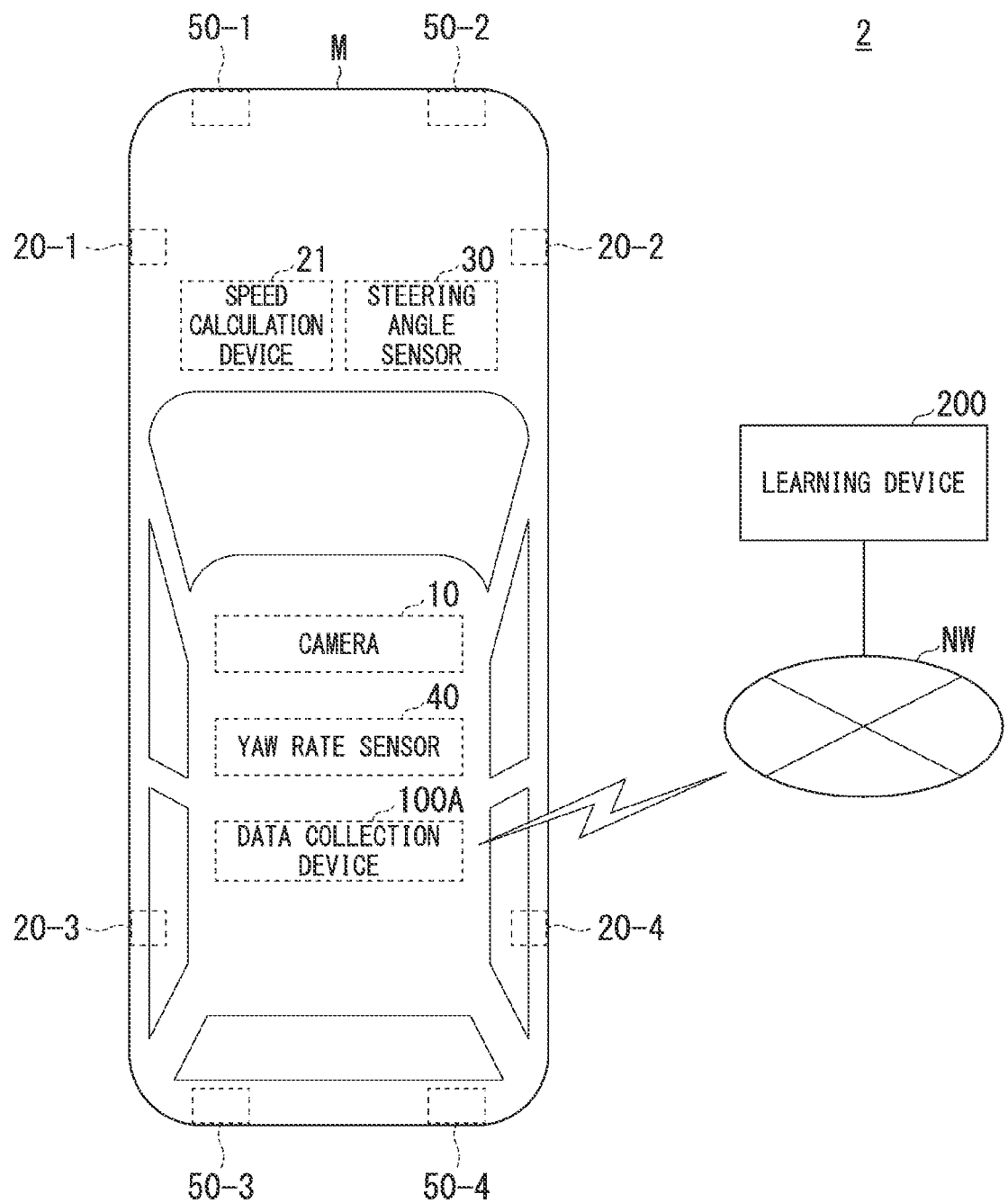
FIG. 7 is a diagram showing an example of a configuration of a data collection system 2 according to a second embodiment.

Hereinafter, a second embodiment will be described. FIG. 7 is a diagram showing an example of a configuration of a data collection system 2 according to the second embodiment. This embodiment is different from the first embodiment in that a data collection device 100A of the data collection system 2 does not have a learning function (the learner 117 of the data collection device 100), and that instead, a learning device 200 configured as a cloud server performs a learning process to generate a determination model. Therefore, hereinafter, a description will be given with a focus on differences from the first embodiment, and common points with respect to those in the first embodiment will not be described. In the description of the second embodiment, the same portions as those in the first embodiment are denoted by the same reference numerals and signs.

Figure 8:
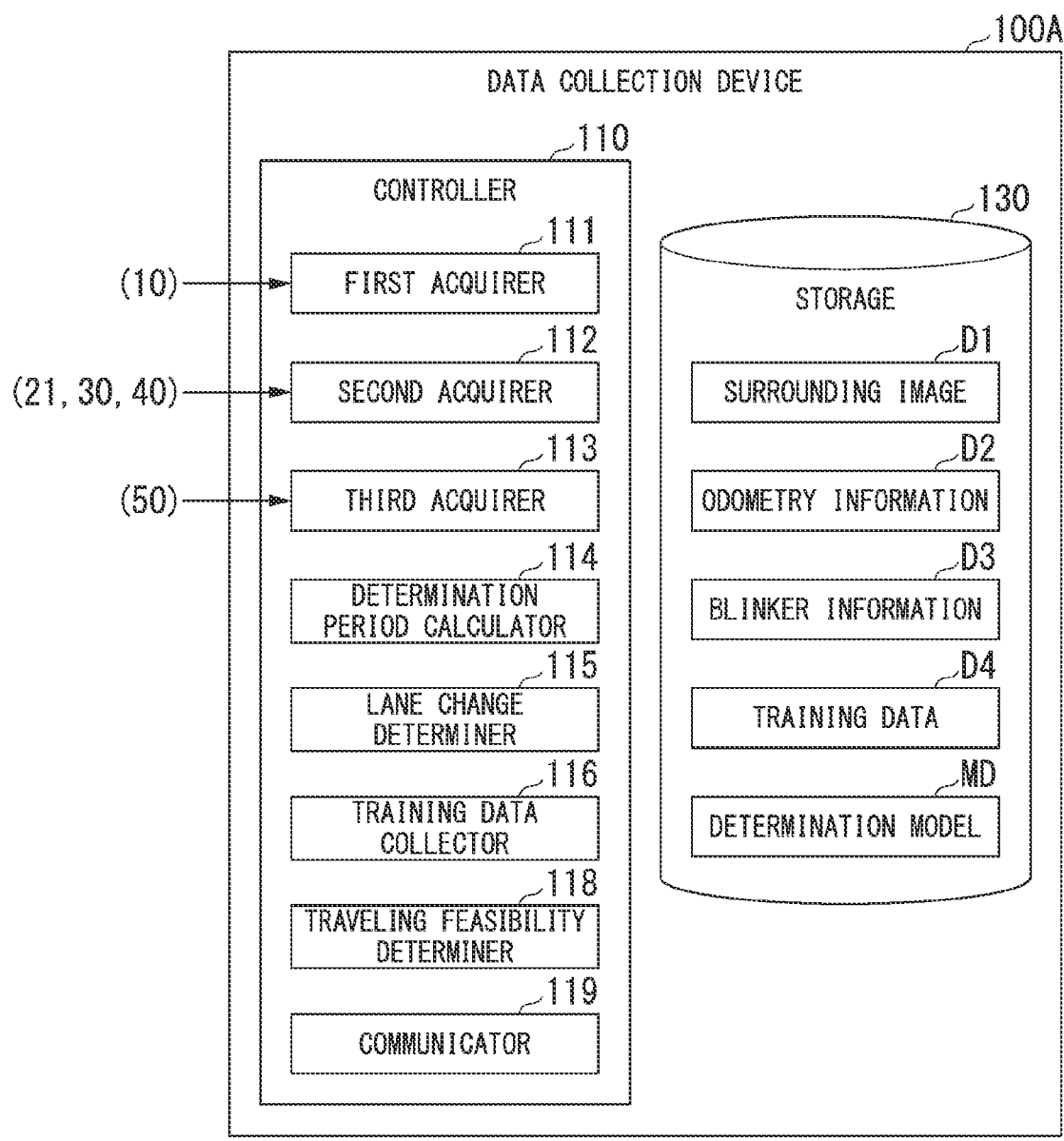
FIG. 8 is a diagram showing an example of a configuration of a data collection device 100A according to the second embodiment.

FIG. 8 is a diagram showing an example of a configuration of the data collection device 100A according to the second embodiment. The controller 110 includes a communicator 119 in addition to the first acquirer 111, the second acquirer 112, the third acquirer 113, the determination period calculator 114, the lane change determiner 115, the training data collector 116, and the traveling feasibility determiner 118. The communicator 119 transmits the training data D4 to the external learning device 200 through a network NW. The network NW includes, for example, a wide area network (WAN), a local area network (LAN), a cellular network, a wireless base station, the Internet, or the like. The learning device 200 includes a communication interface (not shown) for connection to the network NW. The communicator 119 is an example of a "communicator."

The learning device 200 acquires the training data D4 transmitted from the communicator 119 through the network NW, learns the acquired training data D4, and generates a determination model MD. The learning device 200 transmits the generated determination model MD to the data collection device 100A through the network NW. The data collection device 100A acquires the determination model MD generated by the learning device 200 as described above through the network NW and stores the acquired determination model in the storage 130.

That is, the communicator 119 transmits the training data D4 collected by the training data collector 116 to the external learning device 200 and receives the determination model MD generated by the learning device 200 learning the training data D4 from the learning device 200.

The configurations of other functional units of the data collection device 100A of the host vehicle M are the same as those of the first embodiment, and thus a detailed description thereof will be omitted.

According to the data collection system 2 and the data collection device 100A of the second embodiment described above, similarly to the data collection system 1 of the first embodiment, it is possible to easily collect training data for a determination model that determines whether there is an obstacle in a road.

The above-described embodiment can be represented as follows.

A data collection device including:
  a storage device having a program stored therein; and
  a hardware processor,
  wherein the hardware processor executes the program, to thereby
    acquire an image obtained by capturing surroundings of a first vehicle,
    determine whether the first vehicle has performed a lane change during a determination period based on information indicating a traveling history of the first vehicle, and
    collect the image included in the determination period as training data for a determination model that determines whether there is an obstacle in a road in a case where it is determined that the first vehicle has not performed a lane change.

While preferred embodiments of the invention have been described above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data collection device comprising a processor, the processor being configured to execute a program to:
  acquire an image obtained by capturing surroundings of a first vehicle;
  determine whether the first vehicle has performed a lane change during a determination period based on information indicating a traveling history of the first vehicle; and
  collect the image included in the determination period as training data for a determination model that determines whether there is an obstacle in a road in a case where it is determined that the first vehicle has not performed a lane change,
  wherein the processor further calculates the determination period based on information on odometry of the first vehicle and imaging conditions of a camera mounted on the first vehicle.

2. The data collection device according to claim 1, wherein the processor determines whether the first vehicle has performed a lane change based on information on operation of a direction indicator of the first vehicle.

3. The data collection device according to claim 1, wherein the processor
 determines whether a second vehicle traveling in a lane different from a traveling lane of the first vehicle has performed a lane change during the determination period, and
 collects the image included in the determination period as the training data in a case where it is determined that the second vehicle has not performed a lane change.

4. The data collection device according to claim 3, wherein the processor determines whether the second vehicle has performed a lane change based on information on operation of a direction indicator of the second vehicle which is recognized from the acquired image.

5. The data collection device according to claim 1, wherein the processor further learns the collected training data and generates the determination model.

6. A vehicle control device comprising:
 the data collection device according to claim 5,
 wherein the processor further determines whether a traveling lane of the first vehicle is travelable using the determination model.

7. The data collection device according to claim 1, wherein the processor further transmits the collected training data to an external learning device and receives the determination model generated by the learning device learning the training data from the learning device.

8. A data collection system comprising:
 the data collection device according to claim 7;
 a camera mountable on the first vehicle; and
 the learning device.

9. A data collection system comprising:
 the data collection device according to claim 1; and
 a camera mountable on the first vehicle.

10. A data collection method comprising causing a computer to:
 acquire an image obtained by capturing surroundings of a first vehicle;
 determine whether the first vehicle has performed a lane change during a determination period based on information indicating a traveling history of the first vehicle; and
 collect the image included in the determination period as training data for a determination model that determines whether there is an obstacle in a road in a case where it is determined that the first vehicle has not performed a lane change,
 wherein the data collection method further comprises causing the computer to calculate the determination period based on information on odometry of the first vehicle and imaging conditions of a camera mounted on the first vehicle.

11. A non-transitory computer readable storage medium having a program stored therein, the program causing a computer to:
 acquire an image obtained by capturing surroundings of a first vehicle;
 determine whether the first vehicle has performed a lane change during a determination period based on information indicating a traveling history of the first vehicle; and
 collect the image included in the determination period as training data for a determination model that determines whether there is an obstacle in a road in a case where it is determined that the first vehicle has not performed a lane change,
 wherein the program further causes the computer to calculate the determination period based on information on odometry of the first vehicle and imaging conditions of a camera mounted on the first vehicle.

12. A data collection device comprising a processor, the processor being configured to execute a program to:
 acquire an image obtained by capturing surroundings of a first vehicle;
 determine whether the first vehicle has performed a lane change during a determination period based on information indicating a traveling history of the first vehicle; and
 collect the image included in the determination period as training data for a determination model that determines whether there is an obstacle in a road in a case where it is determined that the first vehicle has not performed a lane change,
 wherein the processor:
 determines whether a second vehicle traveling in a lane different from a traveling lane of the first vehicle has performed a lane change during the determination period, and
 collects the image included in the determination period as the training data in a case where it is determined that the second vehicle has not performed a lane change, and
 wherein the processor determines whether the second vehicle has performed a lane change based on information on operation of a direction indicator of the second vehicle which is recognized from the acquired image.

13. A data collection method comprising causing a computer to:
 acquire an image obtained by capturing surroundings of a first vehicle;
 determine whether the first vehicle has performed a lane change during a determination period based on information indicating a traveling history of the first vehicle; and
 collect the image included in the determination period as training data for a determination model that determines whether there is an obstacle in a road in a case where it is determined that the first vehicle has not performed a lane change,
 wherein the data collection method comprises causing the computer to:
 determine whether a second vehicle traveling in a lane different from a traveling lane of the first vehicle has performed a lane change during the determination period, and
 collect the image included in the determination period as the training data in a case where it is determined that the second vehicle has not performed a lane change, and
 wherein the data collection method comprises causing the computer to determine whether the second vehicle has performed a lane change based on information on operation of a direction indicator of the second vehicle which is recognized from the acquired image.

14. A non-transitory computer readable storage medium having a program stored therein, the program causing a computer to:
 acquire an image obtained by capturing surroundings of a first vehicle;

determine whether the first vehicle has performed a lane change during a determination period based on information indicating a traveling history of the first vehicle; and collect the image included in the determination period as training data for a determination model that determines whether there is an obstacle in a road in a case where it is determined that the first vehicle has not performed a lane change, wherein the program causes the computer to:

determine whether a second vehicle traveling in a lane different from a traveling lane of the first vehicle has performed a lane change during the determination period, and collect the image included in the determination period as the training data in a case where it is determined that the second vehicle has not performed a lane change, and wherein the program causes the computer to determine whether the second vehicle has performed a lane change based on information on operation of a direction indicator of the second vehicle which is recognized from the acquired image.

\* \* \* \* \*